(12) United States Patent
Sautter et al.

(10) Patent No.: US 8,393,508 B2
(45) Date of Patent: Mar. 12, 2013

(54) RACK TOWER FOR SECURING CROSSBARS ON TOP OF A VEHICLE

(75) Inventors: Chris Sautter, Portland, OR (US); Dave Condon, Wilsonville, OR (US)

(73) Assignee: Yakima Products, Inc., Beaverton, OR (US)

( * ) Notice: Subject to any disclaimer, the term of this patent is extended or adjusted under 35 U.S.C. 154(b) by 629 days.

(21) Appl. No.: 12/490,265

(22) Filed: Jun. 23, 2009

(65) Prior Publication Data

US 2010/0147914 A1 Jun. 17, 2010

Related U.S. Application Data

(60) Provisional application No. 61/132,956, filed on Jun. 23, 2008.

(51) Int. Cl.
*B60R 9/00* (2006.01)
*B60R 11/00* (2006.01)
*A47G 1/10* (2006.01)
*A47B 96/06* (2006.01)

(52) U.S. Cl. ........ 224/325; 224/331; 224/321; 224/570; 224/558; 248/316.4; 248/229.1

(58) Field of Classification Search .................. 224/325, 224/331, 321, 322, 323, 319, 558, 570, 448, 224/456, 461, 330, 536; 248/229.1, 227.1, 248/316.1, 316.2, 316.3, 316.4, 316.5, 316.6; 81/167, 169; 114/344

See application file for complete search history.

(56) References Cited

U.S. PATENT DOCUMENTS

| | | | | |
|---|---|---|---|---|
| 2,206,328 A | * | 7/1940 | Martinek | 294/85 |
| 2,317,195 A | * | 4/1943 | Husted | 269/182 |
| 2,696,231 A | * | 12/1954 | Pardo | 81/462 |
| 3,221,960 A | | 12/1965 | Gleason | |
| 4,639,036 A | * | 1/1987 | Nichols | 297/184.15 |
| 4,688,706 A | * | 8/1987 | Thulin | 224/329 |
| 4,757,929 A | * | 7/1988 | Nelson | 224/329 |
| 5,033,709 A | * | 7/1991 | Yuen | 248/313 |
| 5,226,570 A | * | 7/1993 | Pedrini | 224/329 |
| 5,275,320 A | * | 1/1994 | Duemmler | 224/319 |
| 5,397,042 A | * | 3/1995 | Pedrini | 224/329 |
| 5,419,479 A | * | 5/1995 | Evels et al. | 224/321 |
| 5,433,356 A | * | 7/1995 | Russell | 224/519 |
| 5,492,258 A | * | 2/1996 | Brunner | 224/321 |
| 5,556,221 A | * | 9/1996 | Brunner | 403/322.4 |
| 5,657,913 A | * | 8/1997 | Cucheran et al. | 224/319 |
| 5,695,164 A | * | 12/1997 | Hartmann et al. | 248/316.4 |
| 5,730,343 A | * | 3/1998 | Settelmayer | 224/321 |
| 5,769,292 A | * | 6/1998 | Cucheran et al. | 224/324 |
| 5,806,735 A | * | 9/1998 | Christiansson et al. | 224/322 |

(Continued)

FOREIGN PATENT DOCUMENTS

EP 0504588 A1 9/1992

OTHER PUBLICATIONS

The International Bureau of WIPO, International Search Report and The Written Opinion of the International Searching Authority, or the Declaration, regarding PCT Application No. PCT/US2009/48334 dated Dec. 3, 2009, 10 pages.

(Continued)

*Primary Examiner* — Nathan J Newhouse
*Assistant Examiner* — Lester L Vanterpool
(74) *Attorney, Agent, or Firm* — Kolisch Hartwell, P.C.

(57) ABSTRACT

A rack for carrying cargo on top of a vehicle includes a pair of crossbars. Each crossbar spans a pair of rails. The crossbars are connected to the rails by towers. Each tower has a claw assembly which is adjustable along two axes.

14 Claims, 5 Drawing Sheets

U.S. PATENT DOCUMENTS

| | | | | |
|---|---|---|---|---|
| 5,845,828 A * | 12/1998 | Settelmayer | | 224/321 |
| 6,010,048 A | 1/2000 | Settelmayer | | |
| 6,112,965 A * | 9/2000 | Lundgren | | 224/322 |
| 6,273,311 B1 * | 8/2001 | Pedrini | | 224/321 |
| 6,491,192 B2 * | 12/2002 | Aki | | 224/309 |
| 6,516,985 B1 * | 2/2003 | Lundgren | | 224/331 |
| 6,568,644 B2 * | 5/2003 | Pedersen | | 248/229.13 |
| 6,622,898 B1 * | 9/2003 | Wang | | 224/321 |
| 6,681,971 B2 * | 1/2004 | Laverack et al. | | 224/319 |
| 6,766,929 B2 * | 7/2004 | Karlsson | | 224/319 |
| 6,793,186 B2 * | 9/2004 | Pedersen | | 248/229.13 |
| 6,796,471 B2 * | 9/2004 | Aftanas et al. | | 224/321 |
| 6,843,394 B2 * | 1/2005 | Aki | | 224/309 |
| 6,918,521 B2 * | 7/2005 | Settelmayer et al. | | 224/319 |
| 7,117,768 B1 * | 10/2006 | Stoeppelwerth | | 81/133 |
| 7,357,283 B2 * | 4/2008 | Settelmayer | | 224/322 |
| 7,367,481 B2 * | 5/2008 | Barbara | | 224/319 |
| 7,416,098 B2 * | 8/2008 | Settelmayer et al. | | 224/319 |
| 2006/0086766 A1 * | 4/2006 | Settelmayer | | 224/323 |
| 2009/0014489 A1 * | 1/2009 | Settelmayer et al. | | 224/558 |

OTHER PUBLICATIONS

European Patent Office, Extended European Search Report, Application No. 09770893.7 dated Sep. 6, 2011, 5 pages.

* cited by examiner

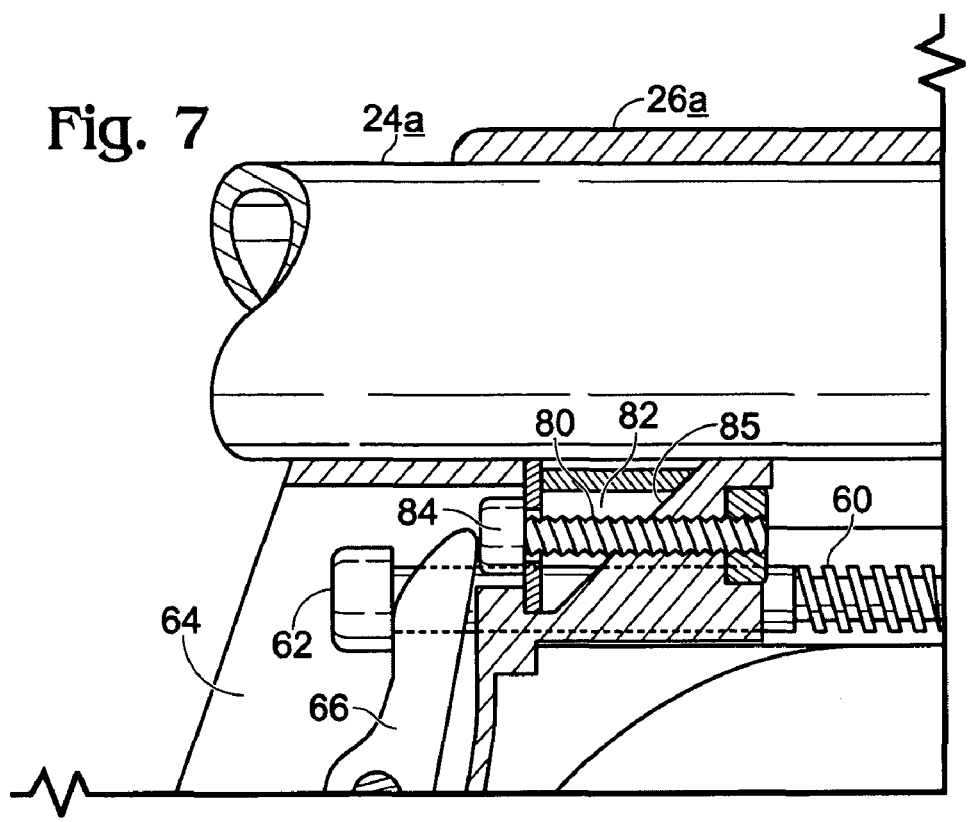
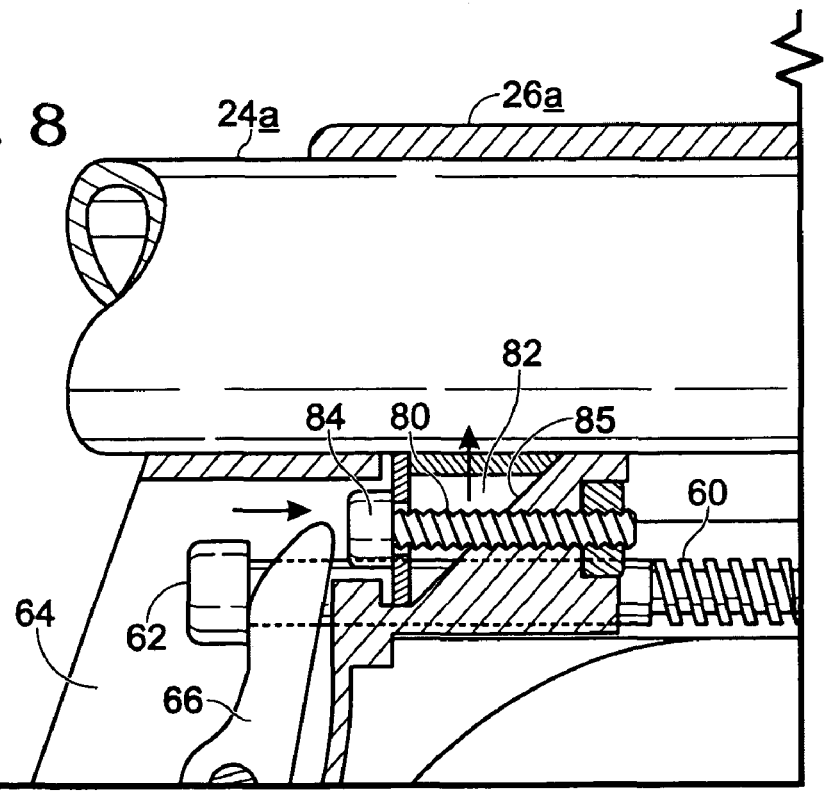

RACK TOWER FOR SECURING CROSSBARS ON TOP OF A VEHICLE

CROSS-REFERENCES TO RELATED APPLICATIONS

This application claims priority from U.S. Provisional Patent Application Ser. No. 61/132,956, filed Jun. 23, 2008, which is incorporated herein by reference. Also incorporated herein by reference is U.S. Patent Application Publication No. US2006/0273123, published Dec. 7, 2006.

BACKGROUND

Sports equipment racks for vehicles typically include a pair of crossbars configured to extend across a vehicle roof widthwise for securing recreational equipment items. Typically, each crossbar is attached to the vehicle roof via a pair of towers.

Many different types of rack towers are known, and may be configured to be attached to a vehicle roof in any of a number of different ways. For example, some rack towers are configured for attachment to rain gutters. Others are designed for attachment to vehicle roof rails. Roof rails are elongate, linear, rigid structures mounted to the roofs of many vehicles, often by the vehicle manufacturer. A vehicle with roof rails typically has two rails running in parallel at least partially along the length of the roof. Roof rails may include a slotted track containing one or more mounts or connectors. Roof rails may be raised or flush with respect to the vehicle roof.

One of the problems with existing towers for securing crossbars on top of vehicles is that the variability in rail configurations requires numerous different tower designs. This places a manufacturing and design burden on manufacturers which increases product costs. The complexity of rail and tower designs also complicates the purchasing process for consumers who must determine which tower design is most appropriate for a given rail configuration. Consumers typically need to select from a line of tower designs configured to fit specifically small raised rails, large raised rails, and flush rails. Reduction of the number of tower products required to fit the various types of vehicle roof rails is an important objective.

BRIEF DESCRIPTION OF THE DRAWINGS

FIGS. 7 and 8 are partial cross-sectional views isolated from the tower shown in

FIG. 5.

DETAILED DESCRIPTION

This disclosure provides numerous selected examples of invented devices for carrying cargo on or with a vehicle. Many alternatives and modifications which may or may not be expressly mentioned, are enabled, implied, currently possessed, and are therefore supported by the disclosure.

Figure 1:
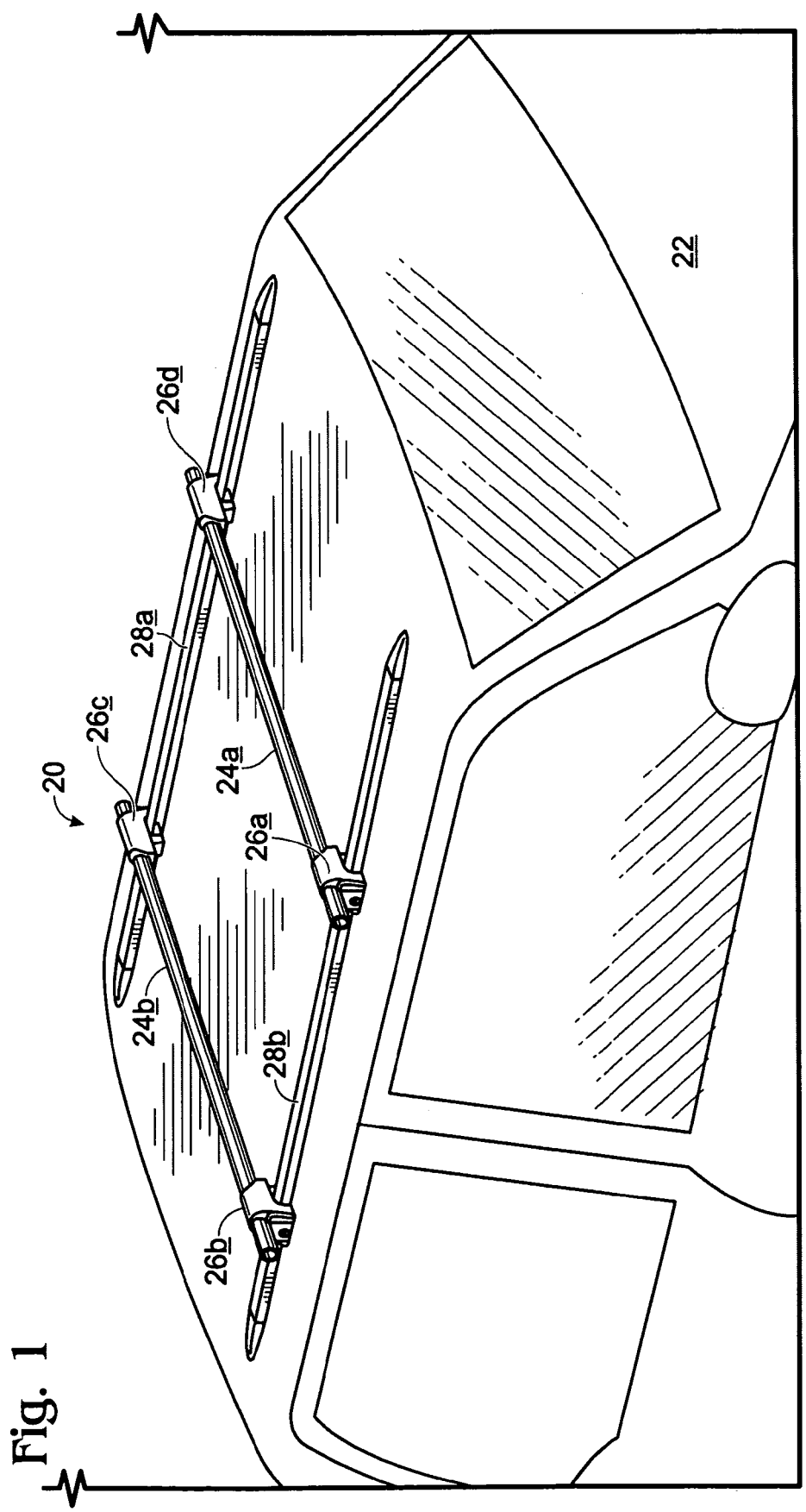
FIG. 1 is a perspective view of a cargo rack on the roof of a vehicle.

FIG. 1 shows rack 20 configured for carrying cargo on vehicle 22. Rack 20 includes a pair of cross bars 24a, 24b. Rack towers 26a-d clamp cross bars 24a, 24b to roof rails 28a, 28b. Towers 26a-d may be adapted to clamp cross bars onto raised rails, having a gap between the rail and the roof of the vehicle, and also to flush rails which do not have a gap between the rail and the vehicle roof.

Figure 2:
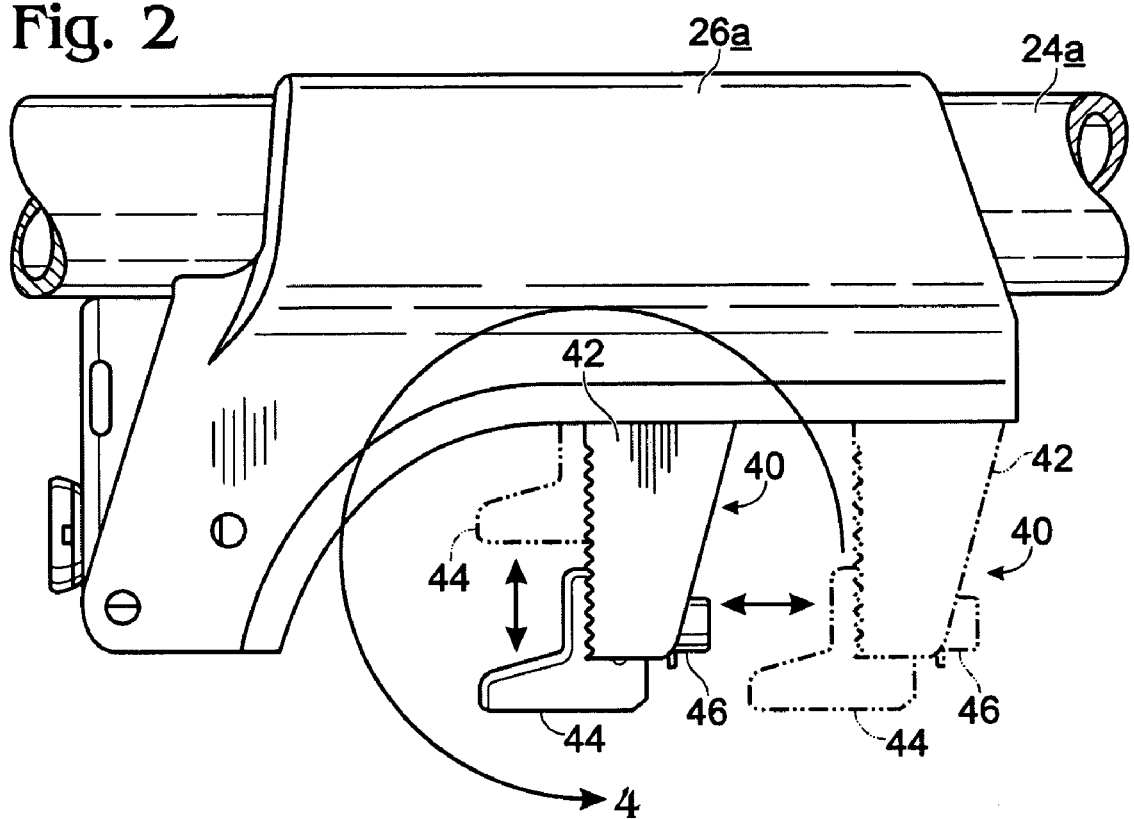
FIGS. 2 and 3 are front views of a tower used to connect cross bars to the roof of a vehicle.
Figure 3:
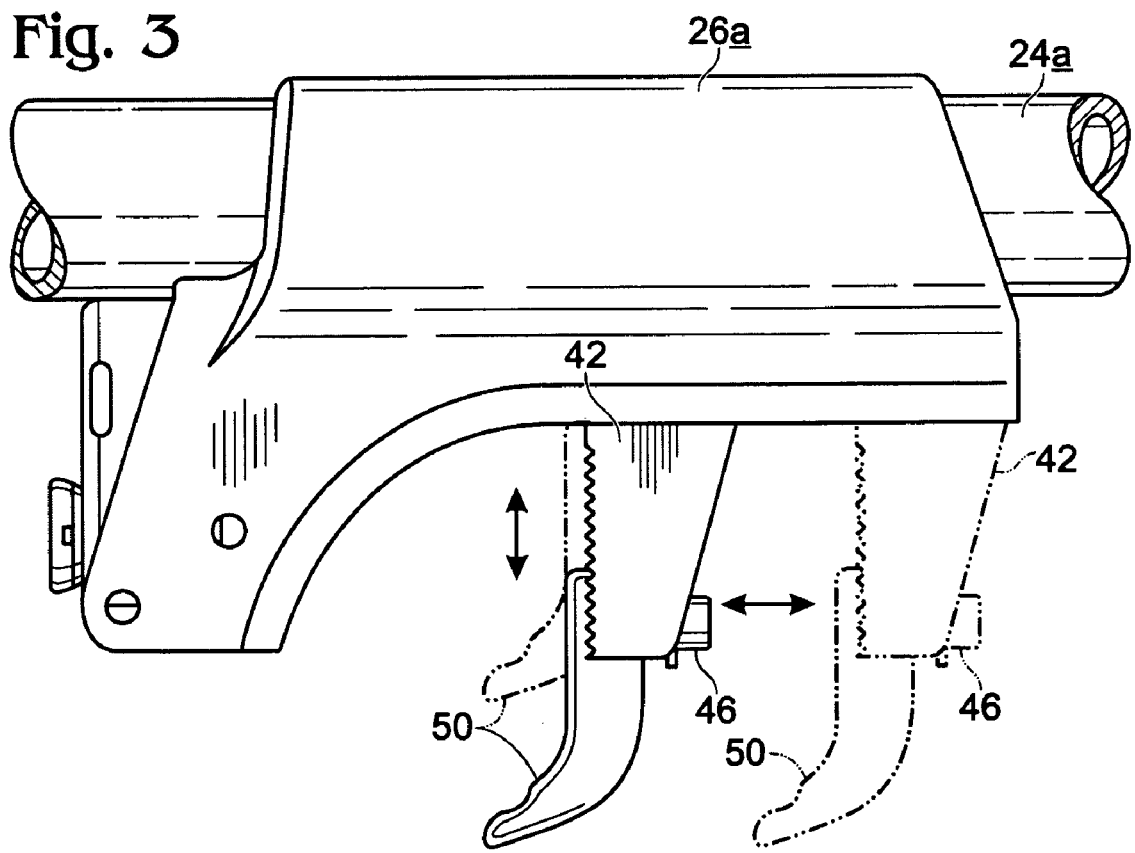

FIGS. 2 and 3 focus on the tower portion of rack 20, particularly an adjustable claw assembly that is used to adapt the tower to clamp onto different rail configurations. In preferred embodiments, the claw assembly has two parts, an upper base portion or upper claw that attaches to the tower and translates horizontally. A lower claw or hook portion is vertically adjustable to accommodate different rail thicknesses. A lower hook portion may also be replaceable to extend the adjustment range. The claw vertical position may be retained by teeth on the upper and lower claw portions. To adjust the claw, the lower claw is rotated toward the rail until the teeth clear the teeth on the upper claw. The lower claw may then slide up or down. When the lower claw is rotated back into place, the teeth retain the position of the lower claw. Clamping the tower against the bar presses the lower claw teeth into the upper claw and retains the vertical position of the hook portion. Additionally, a screw may be used to clamp together the upper and lower claws to retain the adjustment position. The screw is not essential for function but may be helpful to prevent the lower clamp from accidentally changing positions when the tower is not mounted on the bar.

As shown in FIG. 2, tower 26a is used to clamp cross bar 24a onto a rail (not shown). Claw assembly 40 is shown in dashed lines, moved horizontally. Claw assembly 40 includes upper claw or base portion 42. Base portion 42 extends into the housing of tower 26a and is slideable in a track. Lower claw or hook member 44 is connected to base portion 42 and is slideable vertically, as shown in dashed lines. Screw 46 is provided for securing hook member 44 in a selected vertical position relative to base portion 42.

FIG. 3 is similar to FIG. 2 except hook member 44 has been replaced with hook member 50 in order to provide an extended vertical clamping position. The configuration shown in FIG. 3 adds adaptation to a taller or deeper rail dimension. The curvature profile of hook member 50 is also different from the curvature on hook member 44 which may work better for particular rail shapes.

Figure 4:
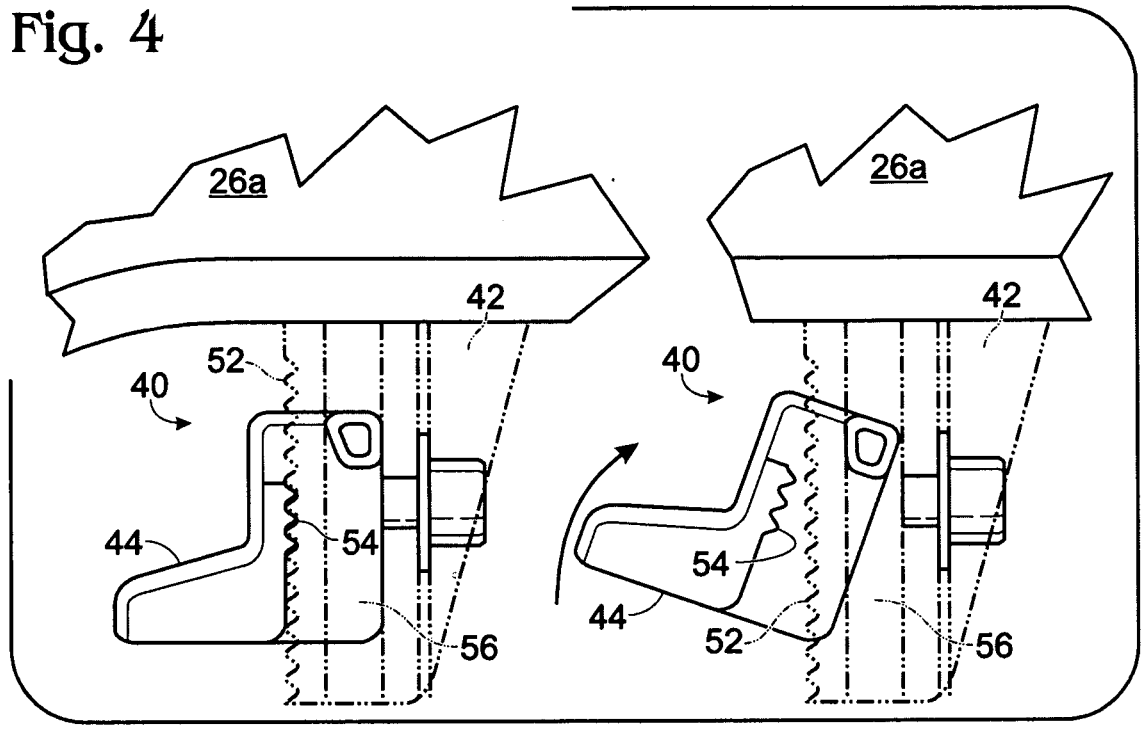
FIG. 4 is a series of isolated schematic views taken from FIG. 2.

FIG. 4 shows a series of two views of claw assembly 40. Base portion 42 has teeth 52 which compliment teeth 54 on hook member 44. In the first view, teeth 54 engage teeth 52, thereby fixing the vertical location of hook member 44 relative to base portion 42. In the second view, hook member 44 is pivoted in a clockwise direction, disengaging teeth 54 from teeth 52, thereby allowing vertical sliding of hook member 44 relative to base portion 42 in a track 56 in base portion 42.

Figure 5:
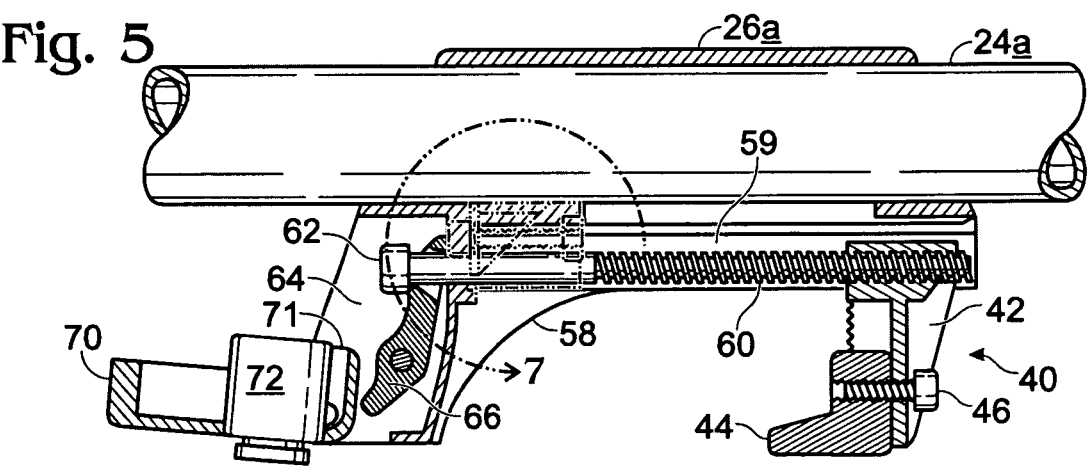
FIGS. 5 and 6 are partial cross-sectional views of the tower used to connect a cross bar to the roof of a vehicle.
Figure 6:
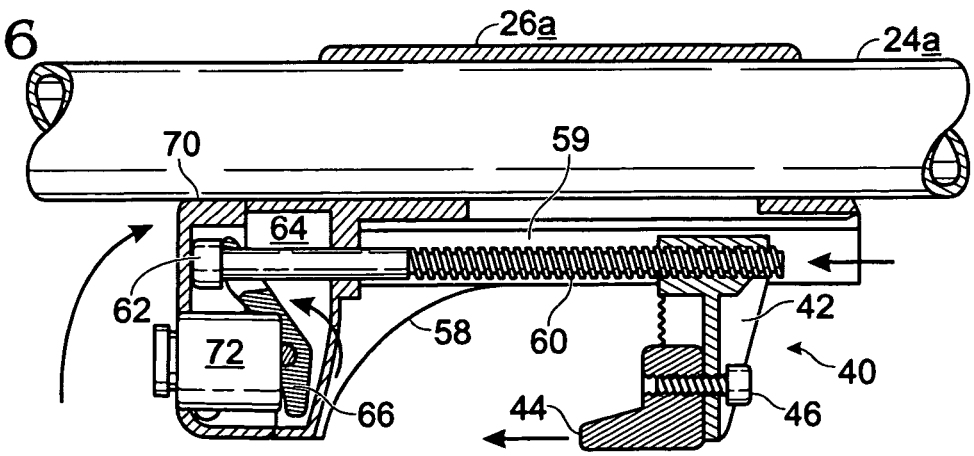

FIGS. 5 and 6 illustrate mechanisms relating to horizontal positioning of the claw assembly relative to a fixed wall of a tower housing, for purposes of securing the tower to a rail on the top of a vehicle. In preferred embodiments, a claw assembly horizontal position is driven by a long screw. The head of the screw may be attached to a lever and the threads may be attached to an upper claw or base portion of a claw assembly. To clamp the tower onto a rail, the screw is turned until the claw is loosely clamping the rail. The adjustment screw may be turned by fingers or a tool. A locking cam cover may then be raised or closed to cover the screw. When the cam cover is raised, a cam surface moves the lever which pulls on the screw. When the screw is pulled, it moves the claw a distance, for example, a half an inch which tightens the clamp on the side rail. Closing the cam cover may also cover a second screw that is used to clamp the tower to the cross bar, as discussed in more detail below.

FIGS. 5 and 6 show details of the preferred mechanism for adjusting the horizontal position of claw assembly 40. Horizontal movement of claw assembly 40 relative to fixed internal wall 58 allows clamping of tower 26a to a rail on top of a vehicle. Screw 60 threads into base portion 42 of claw assembly 40. Head 62 of screw 60 is accessible for horizontal adjustment of claw assembly 40 when installing tower 26a on top of a vehicle. Rotation of head portion 62 of screw 60 causes lateral movement of base portion 42 in track 59 of tower 26a. Head 62 of screw 60 is contained in compartment 64 of tower 26a. Pivotal lever 26 is connected to screw 60 near head 62. In use, loose adjustment of claw assembly 40 around a rail (not shown) is accomplished by manipulating head 62 of screw 60. Compartment cover 70 is shown in open position in FIG. 5. FIG. 6 shows compartment cover 70 pivoted to a closed position which accomplishes at least several functions. First, closure of cover 62 blocks access to head 62 of screw 60, thus prohibiting adjustment or loosening of claw 40, i.e., removal of tower 26a from the vehicle. Further, cover 70 has cam surface 71 which engages lever 66 when cover 70 is rotated to its closed position, causing the opposite end of lever 66 to pull screw 60 horizontally, thus tightening claw assembly 40 relative to fixed wall 58 around a rail. Lid 70, as shown, also has lock device 72 for locking cover 70 in the closed position to avoid theft.

FIGS. 7 and 8 show close-up cross-sectional views of another clamp device used to secure the tower's grip on a cross bar. As shown in FIG. 7, tower 26a grips and supports cross bar 24a. Screw 80 is threaded through wedge member 82. Head 84 on screw 80 may be manipulated to urge wedge 82 forward. As shown in FIG. 8, as wedge 82 moves forward it also moves upward toward cross bar 24 as it slides up ramp 85. Head 84 of screw 80 is contained in compartment 64, similar to head 62 of screw 60. Accordingly, access to screw 80 is only available when cover 70 (FIGS. 5 and 6) is open.

Figure 9:
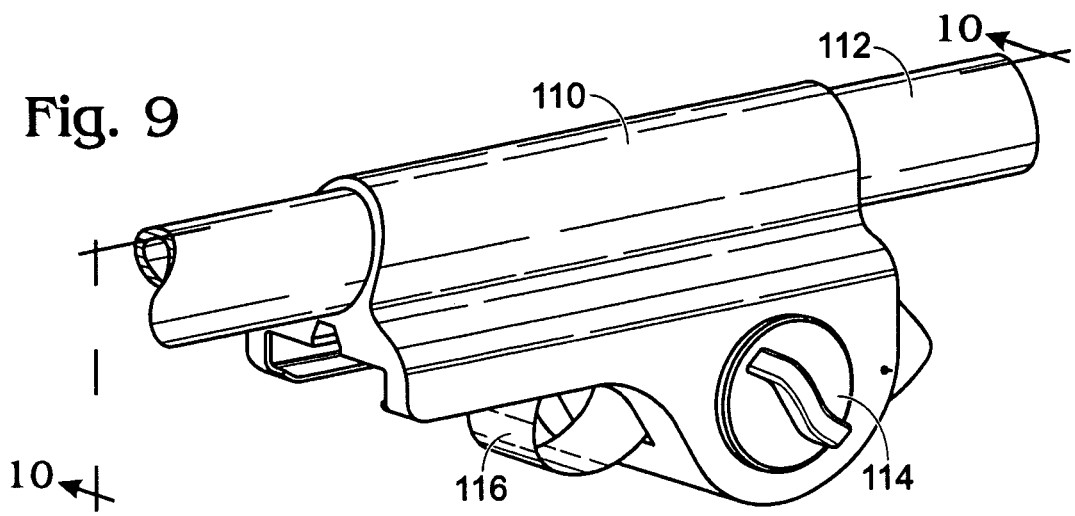
FIG. 9 is a perspective view of an alternative tower embodiment used to connect a cross bar to the roof of a vehicle.
Figure 10:
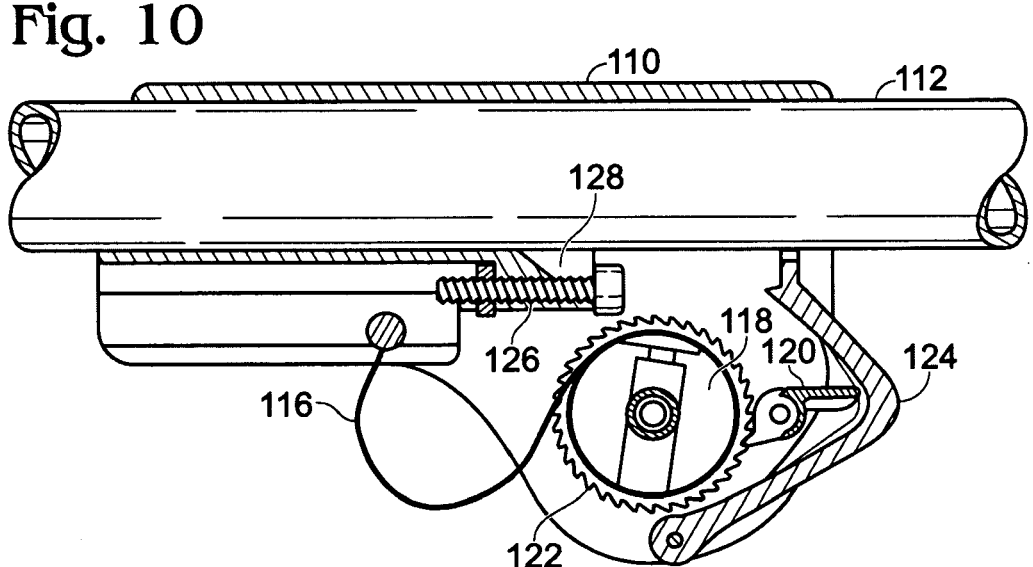
FIG. 10 is a cross-sectional view of the tower embodiment shown in FIG. 9.

FIGS. 9 and 10 illustrate another embodiment of a tower for securing a cross bar to a raised rail on the roof of a vehicle. As shown in FIG. 9, tower 110 supports cross bar 112. Dial 114 may be manipulated to alter the length of slack on belt 116. Belt 116 is intended to loop around a raised rail. FIG. 10 shows a cross section through tower 110 of FIG. 9. Belt 116 wraps around rotatable drum 118 which is connected to external dial 114. Pawl 120 is spring biased toward engagement with teeth 122 on drum 118. When pawl 120 engages teeth 122, drum 118 may only be rotated in one direction (clockwise, as shown) to tighten belt 116 around a raised rail. To loosen belt 116, pawl 120 must be manipulated causing rotation in a counterclockwise direction, thus disengaging pawl 120 from teeth 122. When pawl 120 is disengaged from teeth 122 on drum 118, dial 114 may be turned in a counterclockwise direction, thus loosening belt 116 and enabling removal of tower 110 from a rail on top of a vehicle. Cover 124 may be opened or closed. In the closed position, cover 124 prevents manipulation of pawl 120. Access to pawl 120 is provided when cover 124 is open. Screw 126 engages and interacts with wedge member 128 to secure tower 110 around cross bar 112, substantially as previously described.

Figure 11:
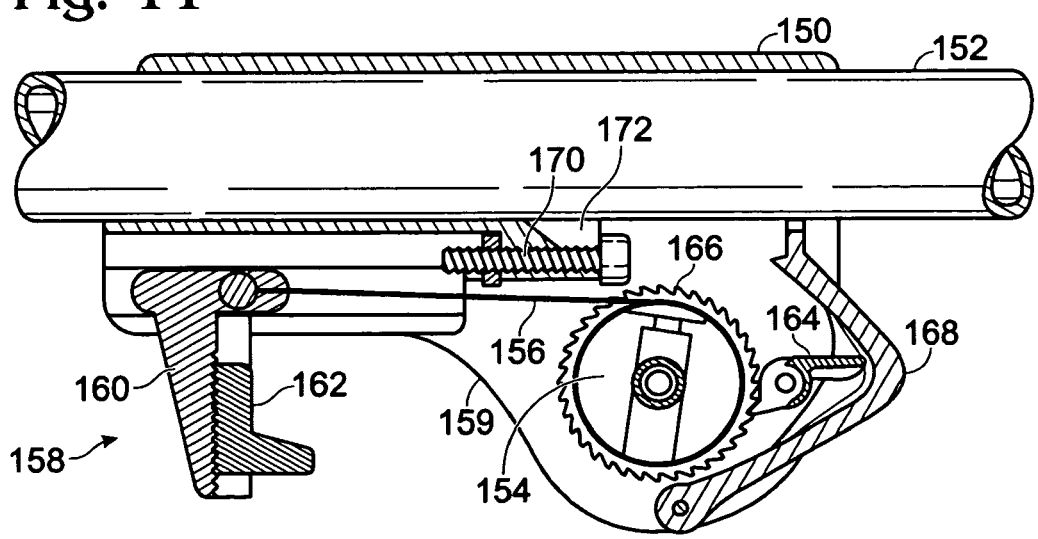
FIG. 11 is a cross-sectional view of another tower embodiment used to attach a cross bar to the roof of a vehicle.

FIG. 11 shows another tower embodiment which combines elements of previously described embodiments in a different way. Tower 150 supports cross bar 152. Drum 154 is connected to belt 156. Rotation of drum 154 in a clockwise direction causes belt 156 to pull claw assembly 158 toward fixed wall 159. Similar to previously described embodiments, claw assembly 158 includes base portion 160 and vertically slideable hook member 162. Pawl 164 is spring biased into engagement with teeth 166 on drum 154. Cover 168 may be closed or open. When cover 168 is closed, as shown, access to pawl 164 is blocked. When cover 168 is open, pawl 164 may be manipulated in a counterclockwise direction, disengaging pawl 164 from teeth 166 of drum 154, thereby permitting horizontal movement of claw assembly 158 away from fixed wall 159 so that tower 150 may be removed from a rail on top of a vehicle. Similar to previously described configurations, screw 170 engages wedge member 172 for purposes of clamping tower 150 around cross bar 152.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

We claim:

1. A rack for carrying cargo on top of a vehicle, the vehicle having a pair of rails, the rails being substantially parallel to each other and to the direction of vehicle travel, the rack comprising:
   a pair of crossbars, each crossbar having a pair of towers for mounting the crossbar on the rails of the vehicle,
   each tower including a clamp device, the clamp device having a fixed wall and a claw assembly that is slideable in a first track back and forth relative to the fixed wall, in a direction parallel to the crossbar,
   each claw assembly having a base portion connected to the first track, the base portion having a second track substantially perpendicular to the first track, and a hook member that is slideable along the second track to adjust a separation of the hook member from the first track, and
   each clamp assembly device having a screw member engaging the base portion, the screw member being parallel to the first track and having a head for manipulating the screw member, rotation of the screw member causing movement of the base portion along the first track, relative to the fixed wall,
   wherein each tower has a compartment containing the head of the screw member, and a pivotal cover blocking access to the head of the screw member when the cover is closed, and permitting access to the head of the screw member when the cover is open.

2. The rack of claim 1, wherein the hook member has teeth that engage a corresponding array of teeth on the base portion to fix location of the hook member in the second track.

3. The rack of claim 1, wherein each tower has a lever operatively connected to the screw member, the cover having a cam portion contacting the lever so that closing of the cover causes the lever to pull the screw member and the claw assembly toward the fixed wall.

4. The rack of claim 1, wherein each tower has a lock device associated with the cover for blocking access to the screw member by locking the cover in a closed position.

5. The rack of claim 3, wherein each tower has a lock device associated with the cover for preventing opening of the cover and release of the screw member and claw assembly.

6. The rack of claim 1, wherein each tower has a plurality of interchangeable hook members of different lengths for adapting the tower to rails of different dimensions.

7. The rack of claim 1, wherein each tower has a crossbar gripping device including a threaded shaft engaging a wedge member which impinges on the crossbar, the threaded shaft having a head accessible in the compartment.

8. A tower for connecting a crossbar to a rail on top of a vehicle comprising:
a clamp device having a fixed wall and a claw assembly that is slideable in a first track back and forth relative to the fixed wall, in a direction parallel to the crossbar, the claw assembly having a base portion connected to the first track, the base portion having a second track substantially perpendicular to the first track, and a hook member that is slideable along the second track to adjust a separation of the hook member from the first track while the claw assembly remains at the same position in the first track,
a screw member engaging the base portion, the screw member being parallel to the first track and having a head for manipulating the screw member, rotation of the screw member causing movement of the base portion along the first track, relative to the fixed wall, and
a housing having a compartment containing the head of the screw member, and a pivotal cover blocking access to the head of the screw member when the cover is closed, and permitting access to the head of the screw member when the cover is open.

9. The tower of claim 8, wherein the hook member has teeth that engage a corresponding array of teeth on the base portion to fix location of the hook member in the second track.

10. The tower of claim 8 further comprising:
a lever operatively connected to the screw member, the cover having a cam portion contacting the lever so that closing of the cover causes the lever to pull the screw member and the claw assembly toward the fixed wall.

11. The tower of claim 8 further comprising:
a lock device associated with the cover for blocking access to the screw member by locking the cover in a closed position.

12. The tower of claim 10 further comprising:
a lock device associated with the cover for preventing opening of the cover and release of the screw member and claw assembly.

13. The rack of claim 8 further comprising:
a plurality of interchangeable hook members of different lengths for adapting the tower to rails of different dimensions.

14. The rack of claim 8 further comprising:
a crossbar gripping device including a threaded shaft engaging a wedge member which impinges on the crossbar, the threaded shaft having a head accessible in the compartment.

* * * * *